United States Patent [19]

Lilly et al.

[11] Patent Number: 5,741,532
[45] Date of Patent: Apr. 21, 1998

[54] APPARATUS FOR INTRODUCING ADDITIVES INTO A GRID SPINNING SYSTEM

[75] Inventors: Robert L. Lilly, Asheville; Charles H. Rogers, Candler; Zachary G. Shoaf, Canton, all of N.C.; Wayne L. Conard, Talbott; Steve C. Parks, Newport, both of Tenn.

[73] Assignee: BASF Corporation, Mt. Olive, N.J.

[21] Appl. No.: 557,802

[22] Filed: Nov. 20, 1995

[51] Int. Cl.[6] .................................. B29C 47/78
[52] U.S. Cl. ................. 425/197; 219/421; 219/438; 264/78; 264/211; 425/378.2; 432/209
[58] Field of Search ........................ 425/144, 145, 425/200, 378.2, 197, 382.2; 264/40.6, 78, 177.2, 210.6, 211, 176.1; 432/209; 219/421, 438; 366/147, 148

[56] References Cited

U.S. PATENT DOCUMENTS

| | | | |
|---|---|---|---|
| 2,217,743 | 10/1940 | Greenewalt | 425/449 |
| 2,374,069 | 4/1945 | Balthis | 264/211 |
| 2,683,073 | 7/1954 | Pierce | 425/382.2 |
| 3,102,301 | 9/1963 | Dechene | 425/378.2 |
| 3,829,543 | 8/1974 | Robertson | 264/78 |
| 3,923,727 | 12/1975 | Jost et al. | 524/171 |
| 4,012,348 | 3/1977 | Chelland et al. | 264/211 |
| 4,221,692 | 9/1980 | Lambertini et al. | 264/211 |
| 4,289,718 | 9/1981 | Vollbrecht et al. | 264/211 |
| 4,379,913 | 4/1983 | Waitkus | 528/300 |
| 4,405,734 | 9/1983 | Fuchs et al. | 524/90 |
| 4,453,867 | 6/1984 | Sharps | 366/98 |
| 4,490,542 | 12/1984 | Iqbal et al. | 548/453 |
| 4,639,205 | 1/1987 | Lim | 425/200 |
| 5,093,062 | 3/1992 | Deeg et al. | 264/176.1 |
| 5,157,067 | 10/1992 | Burditt et al. | 524/270 |
| 5,364,582 | 11/1994 | Lilly | 264/211 |
| 5,614,142 | 3/1997 | Lilly et al. | 264/211 |

*Primary Examiner*—Jay H. Woo
*Assistant Examiner*—Joseph Leyson

[57] ABSTRACT

An apparatus for melting particulate polymeric material includes a melting grid and a molten polymer reservoir beneath the grid. The apparatus has a lateral cross-sectional contour defined by walls. Further included is a distribution device having upper and lower surfaces and adapted to the contour of the molten polymer reservoir, which device is disposed in the molten polymer reservoir in proximity to the grid. The device has an internal reservoir formed between the upper and lower surfaces; a perimetrical surface joining the upper and lower surfaces and providing the device with height; at least two fluid distribution pores, each having one end in communication with the internal reservoir and another end disposed in the circumferential surface; and an injection tube providing fluid flow communication between the internal reservoir and an external supply of fluid.

5 Claims, 3 Drawing Sheets

5,741,532

APPARATUS FOR INTRODUCING ADDITIVES INTO A GRID SPINNING SYSTEM

FIELD OF THE INVENTION

The present invention relates generally to melt spinning thermoplastic materials on a grid spinning system. More specifically, the present invention relates to the introduction of additives into the melt reservoir of a grid spinning system.

BACKGROUND OF THE INVENTION

As used herein, the term "fibers" or "fiber" refers both to filaments (strands of indefinite or continuous length) and staple (strands of short and definite length).

There are several general methods for extruding thermoplastic polymers into fibers. One of these methods is known as grid spinning because the solid flakes or chips of polymer are melted on a heated grid. U.S. Pat. No. 2,683,073 to Pierce and U.S. Pat. No. 3,102,301 to Dechene describe conventional grid spinning processes.

In the manufacture of fibers, it is sometimes desirable to introduce different materials into the melt in order to provide the fibers with certain functional characteristics. For example, $TiO_2$ is sometimes added to the polymer melt to deluster the resulting fiber. There are several methods for adding such additives to the grid spinning fiber extrusion process. The solid polymer chips or flakes may be dusted with the additive prior to melting the chips or flakes on the grid. One such dusting process is described in U.S. Pat. No. 4,490,542 to Iqbal et at. Similarly, U.S. Pat. No. 4,379,913 to Waitkus describes adding antistatic agents from a solvent solution to chips or flakes of polymer, drying the coated polymer chips or flakes and spinning the dried coated polymer chips or flakes to yarn by, for example, melting on a grid into a stirred pool. U.S. Pat. No. 3,923,727 to Jost et al. describes sprinkling chips with finely divided dye staff and then melting the chips according to usual grid spinning processes.

Another method for introducing additives is to mix solid additive concentrate pellets with the host polymer chips or flakes. U.S. Pat. No. 3,829,543 to Robertson describes a process for mixing pellets of a coloring additive with chips of the host polymer prior to melting.

Incidentally, another method for melt spinning is to melt the polymer chips in a screw extruder. Additives may be added directly to the extruder, often using a sidearm of the extruder. U.S. Pat. No. 4,405,734 to Fuchs et al. describes a process wherein dye stuff can be metered directly into the melt of the thermoplastic via a side screw to achieve homogeneous mixing or using a coiled grid spinning system. Generally, screw extrusion processes result in fairly homogeneous mixtures of the additives in the melt due to the mixing action of the screw. Grid melting systems suffer in this regard because the melting process itself is without agitation.

The lack of agitation has been recognized to cause certain problems such as gel formation and spherulite seeding due to unmelted particles. Equipping the grid with mechanical stirring is one method of providing homogeneity in the melt. U.S. Pat. No. 4,453,867 to Sharps describes a disc stirring apparatus for grid melting systems. U.S. Pat. No. 4,639,205 to Lira describes a shaft impeller for grid melting systems.

U.S. Pat. No. 5,157,067 to Burdirt et al. describes a liquid concentrate system that may be incorporated into fibers. U.S. Pat. No. 5,364,582 to Lilly describes the use of the liquid concentrate described in U.S. Pat. No. 5,157,067 to introduce antistatic agents into the throat of a fiber spinning extruder.

Not all grid spinning equipment is, however, equipped with agitation means. There remains a need for an apparatus to homogeneously introduce additives into unagitated (by actuated mechanical mixing) grid melting systems. It is understood that the molten flow of polymer will itself provide a degree of mixing. As recognized, however, mechanically driven mixing means are often provided.

SUMMARY OF THE INVENTION

Accordingly, the present invention provides an improvement apparatus for melting particulate polymeric material including a melting grid; a molten polymer reservoir beneath the grid; and a lateral cross-sectional contour defined by walls. The improvement includes a distribution device having upper and lower surfaces and adapted to the contour of the molten polymer reservoir and disposed in the molten polymer reservoir in proximity to the grid. The device includes an internal reservoir formed between the upper and lower surfaces; a perimetrical surface joining the upper and lower surfaces and providing the device with height; at least two fluid distribution pores, each pore having one end in communication with the internal reservoir and another end disposed in the circumferential surface; and an injection tube providing fluid flow communication between the internal reservoir and an external supply of fluid.

It is an object of the present invention to homogeneously introduce additives into a generally unagitated melt reservoir of a grid spinning system.

Related objects and advantages will become apparent to the ordinarily skilled after reading the following detailed description.

DETAILED DESCRIPTION OF THE PREFERRED EMBODIMENTS

To promote an understanding of the principles of the present invention, descriptions of specific embodiments of the invention follow and specific language describes the same. It will nevertheless be understood that no limitation of the scope of the invention is thereby intended, and that such alterations and further modifications, and such further applications of the principles of the invention as discussed are contemplated as would normally occur to one ordinarily skilled in the art to which the invention pertains.

Figure 1:
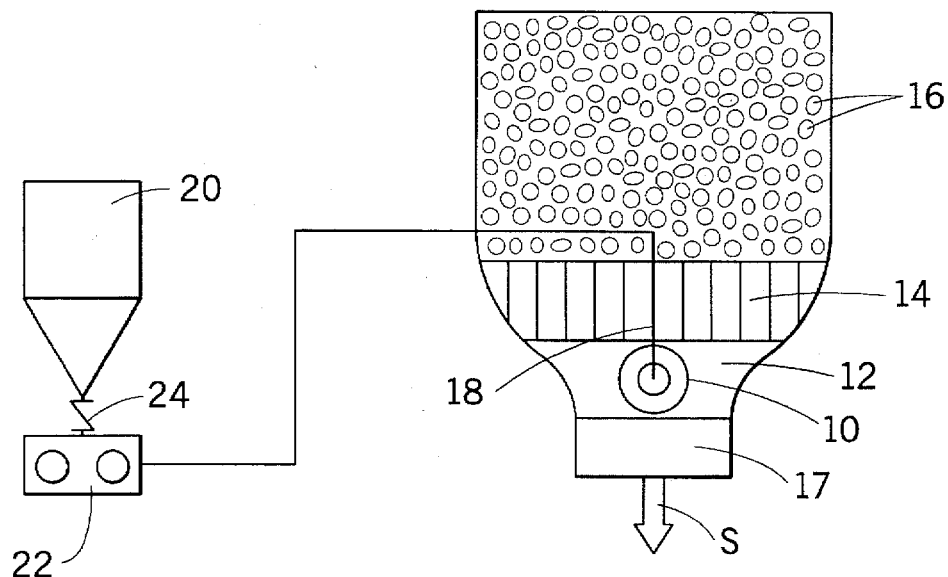
FIG. 1 is a schematic illustration of the device of the present invention installed in a grid spinning system.

As noted, not all grid spinning equipment has impelled mechanical agitation capabilities. Therefore, the present invention is an apparatus for introducing additives into a generally unagitated (other than by flow of the melt itself) melt reservoir of a grid spinning system and thereafter spinning fibers which display substantial homogeneity of the characteristic imparted. FIG. 1 is a schematic illustration of the apparatus positioned in a grid spinning system. FIG. 1 shows only a portion of a grid system. The remainder of the grid system is apparent to those of ordinary skill in the art and could be similar to the system described in U.S. Pat. No. 3,102,301 which is hereby incorporated by reference as a general description of a grid system.

FIG. 1 shows distribution device 10 of the present invention positioned in the molten polymer reservoir 12 of a grid spinning system. Distribution device 10 is shown positioned below grid bars 14 on which unmelted polymer 16 is melted. Preferably distribution device 10 is above the level of the molten polymer mass 17 contained in reservoir 12. Molten polymer from molten polymer mass 17 flows in the direction of arrow S to a spinneret assembly (not shown). Injection tube 18 is connected to distribution device 10 in fluid flow communication to provide liquid additive flow from additive reservoir tank 20 to distribution device 10. Metering pump 22 may be present to impel the additive to distribution device 10. Valve 24 may be used to stop the flow of liquid additive from additive reservoir tank 20 to metering pump 22. Any suitable metering pump may be used. One particular pump which may be used is a Zenith Viscose 1.6 cc metering pump. Injection tube 18 may have any cross-sectional area suitable for the desired additive addition rate. One-eighth inch (⅛") tube is an exemplary suitable size.

The positioning of distribution device 10 in molten polymer reservoir 12 is of some importance in the performance of the distribution device. Although the exact positioning of distribution device 10 within the reservoir will depend at least in part on the exact design and capacity of the grid system, the presently preferred location of distribution device 10 in a grid system is about 1.25 inches to 1.5 inches above the molten polymer mass. It is preferred that the distribution device residue is above the actual molten polymer as a precaution in case the melt temperature falls too low and the molten polymer begins to solidify. Solidification of the polymer distribution device 10 may block its distribution opening.

The diameter of distribution device 10 will, of course, be dependent on the size of the grid. However, for a 20 cm grid as measured at the upper surface, a 2.5 inches to 3 inches diameter injection device is presently preferred.

Figure 2:
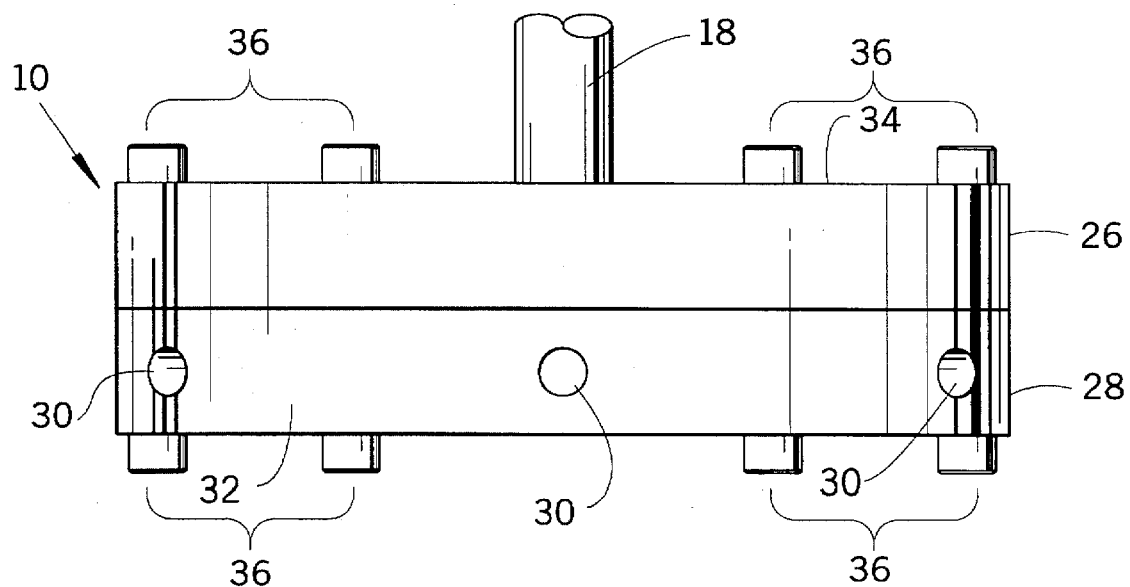
FIG. 2 is a side elevational view of the distribution device of the present invention.

Turning now to FIGS. 2-7, distribution device 10 is illustrated in more detail. FIG. 2 shows a side elevational view of distribution device 10. Distribution device 10 has a top plate 26 and bottom plate 28. Bottom plate 28 includes distribution pores 30 which may be machined through its external wall 32. Injection tube 18 is shown (partially) attached to upper surface 34 of top plate 26. Bolts 36 are used to sealingly clamp top plate 26 to bottom plate 28.

Figure 3:
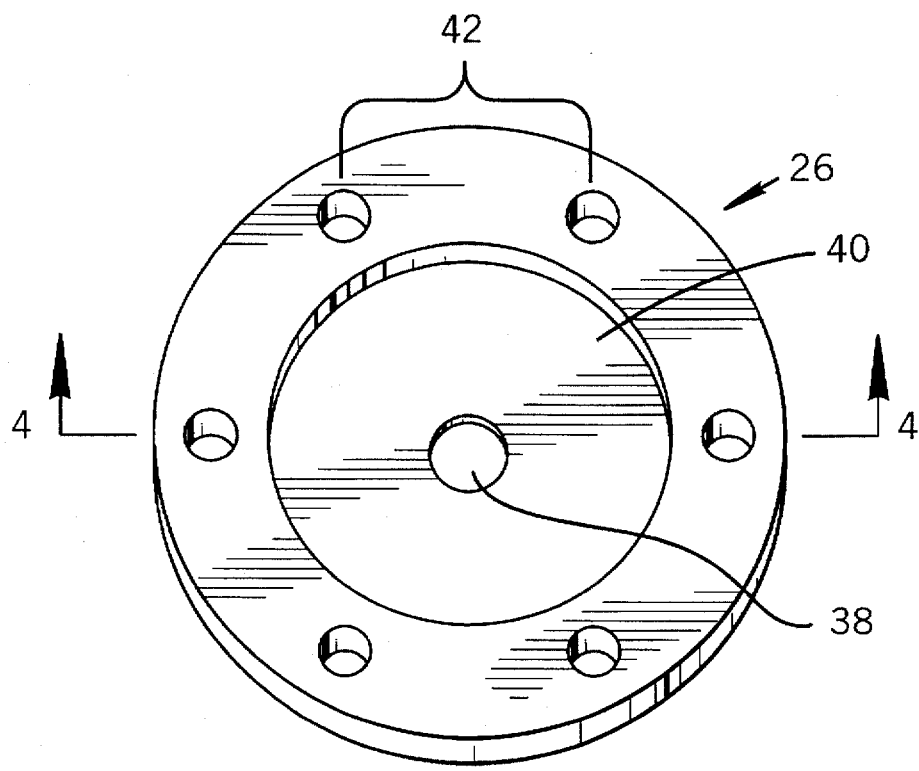
FIG. 3 is a bottom plan view of the top plate of the distribution device of the present invention.

FIG. 3 is a bottom plan view of upper plate 26. Injection port 38 connects to injection tube 18 in fluid flow communication such that liquid additive flows into the lower surface of upper plate 26 and is retained in circular indentation 40. Bolt holes 42 are also shown. Injection port 38 may be of any size suitable to mate with injection tube 18. One currently used size is about 0.25 inches in diameter.

Figure 4:
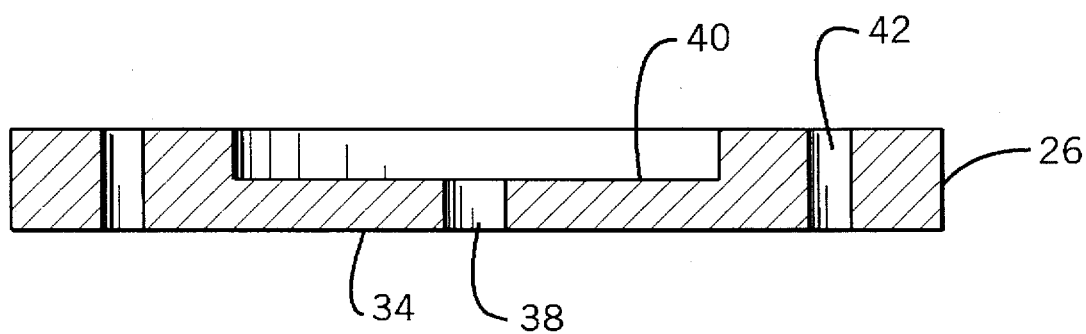
FIG. 4 is an elevational cross-sectional view of the top plate of FIG. 3 taken along lines 4—4.

FIG. 4 is a side cross-sectional view of top plate 26 taken along lines 4—4 of FIG. 3. Indentation 40 is more clearly shown in this FIG. 4 as being formed in top plate 26. Bolt holes 42 are shown in cross-section as is injection port 38.

Figure 5:
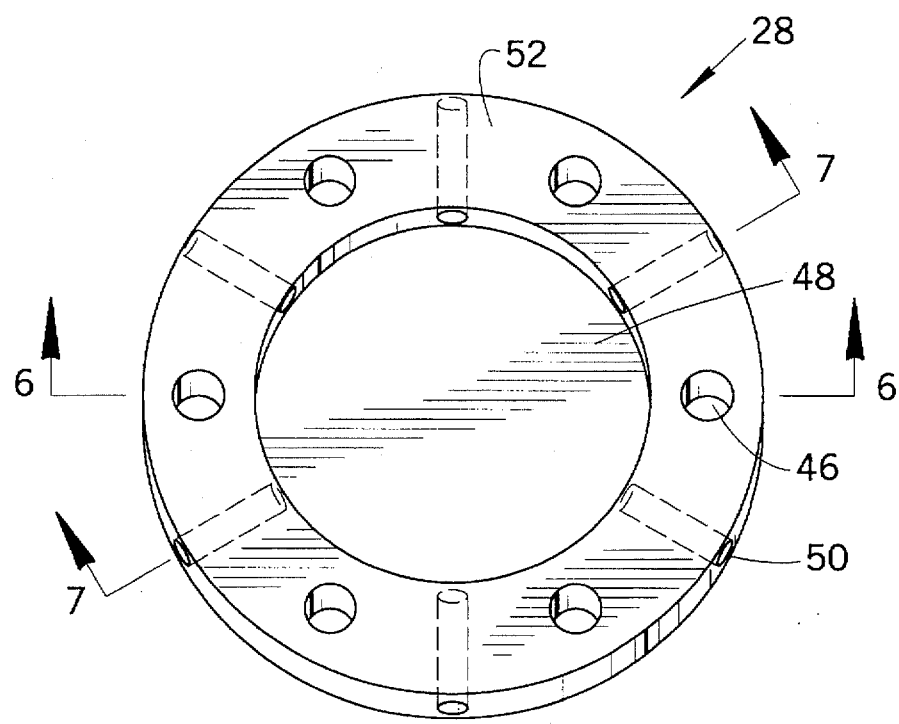
FIG. 5 is a top plan view of the bottom plate of the distribution device of the present invention.

FIG. 5 shows bottom plate 28 in a top plan view. Bolt holes 46 are provided to mate with bolt holes 42 of upper plate 26. When upper plate 26 and bottom plate 28 are joined, Indentation 48 corresponds with indentation 40 in upper plate 26 to form an additive reservoir. Distribution pores 50 are shown in phantom approximately evenly spaced through reservoir wall 52 of bottom plate 28. There preferably are two or more, but preferably, four to eight, distribution channels 50 provided in distribution device 10 according to the presently preferred dimensions. Of course, if distribution device 10 is very large, more distribution pores could be advantageous. In FIG. 5, six are shown. The presently preferred diameter of distribution channels 50 is about 0.045 inches. Of course, this diameter will depend on the other dimensions of the distribution device, too.

Figure 6:
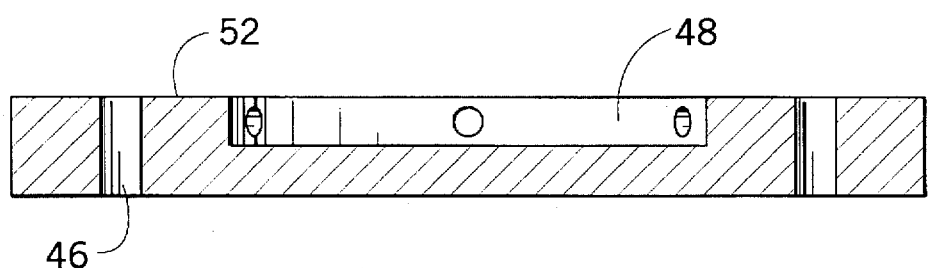
FIG. 6 is an elevational cross-sectional view taken along lines 6—6 of FIG. 5.

FIG. 6 is a cross-sectional side elevational view of bottom plate 28 taken along lines 6—6 of FIG. 5 looking in the direction of the arrows. Indentation 48 formed by reservoir wall 52 is shown. Bolt holes 46 are also shown.

Figure 7:
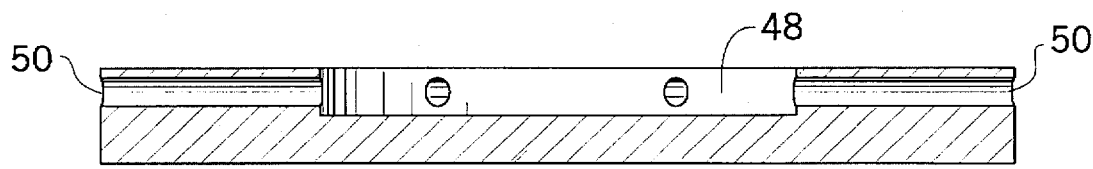
FIG. 7 is an elevational cross-sectional view taken along lines 7—7 of FIG. 5.

FIG. 7 is a cross-sectional side elevational view of bottom plate 28 taken along lines 7—7 of FIG. 5. This cross-sectional view illustrates the orientation of distribution channels 50 and the correspondence of such distribution channels with the indentation 48 so as to permit fluid flow from the inside of distribution device 10 to the outside.

The device of the present invention permits, for example, additive addition to supply of a molten polymer reservoir beneath a melting grid. The melting grid is heated to a temperature sufficient to melt the solid thermoplastic supplied above it such that the melted thermoplastic flows through the grid and is collected in the molten polymer reservoir located beneath the grid. The additive in its carder is injected into the molten polymer reservoir below the melting grid. The additive could be present in an aqueous or non-aqueous carder or in no carrier at all. Following the injection of the additive, a substantially homogeneous mixture forms and, subsequently, is extruded into fibers.

Although the device of the present invention may be used with any conventional grid spinning apparatus, with or without mechanical agitation, it is most advantageously used in apparatus without mechanical agitation because, when the device of the present invention is used, mechanical agitation is not necessary to provide homogeneous incorporation of additives in the spun fibers. In addition to the conventional melt grid spinning apparatus described in U.S. Pat. No. 3,102,301, another conventional apparatus is described in U.S. Pat. No. 2,217,743.

The device of the present invention is useful in extruding any suitable thermoplastic polymer, such as polyamides, polyesters, polyethylene and polypropylene. This invention is particularly useful with polyamide polymers. Examples of useful polyamide polymers are nylon 6, nylon 12, nylon 6,6, nylon 6T and various copolymers thereof Such thermoplastics are generally supplied in the form of powders, chips, or granules.

The melting grid will be heated to a temperature sufficient to melt the thermoplastic polymer being extruded. In the case of nylon 6, this temperature is generally between 260° C. and 285° C.

Additives which may be added according to the present invention include a variety of additives such as (without limitation) pigments, antistatic agents, delusterants, flame retardants, heat stabilizers, light stabilizers, dye regulating agents and combinations thereof It is especially preferred to add pigment with the device of the present invention because colorants are particularly sensitive to concentration gradients in the melt. Such gradients will appear as streaks in the woven, knit or tufted articles made form fibers extruded from such a melt. The present invention permits addition of pigments to the grid without creating streaks in the final articles.

One especially advantageous use of the present invention is for hosiery yarn or other yarn which is typically dyed after extrusion. The use of dyebaths and other after extrusion dyeing methods leads to waste and environmental contamination. Melt coloration eliminates the waste from dyebaths, etc.

The use of the invention is described by reference to the following detailed examples. The examples are set forth by way of illustration, and are not intended to limit the scope of the invention. In the following examples, the following test procedures were used:

RV: Relative viscosity is measured in $H_2SO_4$.

Tenacity and Elongation: Tenacity and elongation are measured in accordance with ASTM D2256, "Standard Test Method for Tensile Properties of Yarns by the Single-Strand Method."

Evenness: Evenness is measured using ASTM D 1425, "Unevenness of Textile Strands Using Zellweger Uster Capacitance Testing Equipment."

Superloft: Superloft is measured using ASTM D403 1-81, "Standard Test Method For Bulk Properties Of Textured Yarns."

% Carbon Black: % Carbon black is measured using standard nephelometric methods. A Milton-Roy 21 DUV spectrophotometer is used at a wave length of 450 nm.

ACS Color Value: ACS color value is measured using AATCC Test Method 153-1985. An ACS 4500-Spectro Sensor II is used and instructions in the operators' handbook are followed.

EXAMPLES A–D

A liquid color concentrate is formulated as described in U.S. Pat. No. 5,157,067. This color concentrate contains 40 wt % carbon black.

A production capacity grid spinning machine is set up to spin normal 27/5 POY nylon 6. The grid temperature is 275° C. with a spinneret output of 10.5 gms/min through a 5 hole round cross-section spinneret.

A positive-displacement gear pump is used to inject the liquid color concentrate through the circular-shaped distribution device 10 installed in the grid pot above the molten polymer level. The 40 wt % carbon black concentrate is added at a rate to achieve a 0.8% concentration of carbon black in the fiber. The yarn (27/5 round cross-section nylon partially oriented yarn) is spun at 4200 m/min. This yarn is drawtextured on an FK-6-S 12 texturing machine available from American Barmag Corporation.

Several POY yarns A–D are made from a single machine by simultaneously routing the molten polymer from the grid pot through four spinnerets. The four yarns are evaluated for various properties as shown in Table 1.

TABLE 1

| Example | RV | Denier | Tenacity (g/den) | Elongation (%) | Evenness (% CV) |
|---------|------|--------|------------------|----------------|-----------------|
| A | 2.89 | 27.09 | 4.10 | 79.8 | 0.55 |
| B | 2.90 | 27.17 | 3.97 | 77.4 | 0.62 |
| C | 2.92 | 27.51 | 3.89 | 75.6 | 0.72 |
| D | 2.89 | 21.10 | 3.95 | 77.2 | 0.88 |

These yarns are each drawtextured and found to be suitable as textile yarns, e.g., hosiery yarn. These yarns are evaluated for various properties and the results are shown in Table 2.

TABLE 2

| Example | Denier | Tensity (g/den) | Elongation (%) | Evenness (% CV) | Superloft (%) |
|---------|--------|-----------------|----------------|-----------------|---------------|
| A | 20.41 | 4.70 | 26.0 | 0.75 | 70.8 |
| B | 20.37 | 4.66 | 25.5 | 0.55 | 71.2 |
| C | 20.19 | 4.71 | 25.7 | 0.90 | 66.8 |
| D | 20.93 | 4.58 | 26.5 | 1.02 | 68.8 |
| Control* | 19.35 | 4.71 | 27.6 | 0.60 | 67.6 |

*Control is 20/5 delustered round cross-section from standard production textured yarn (without carbon black concentrations) processed under same conditions as examples A–D except at lower draw ratio (1.26 versus 1.38 for the invention examples).

To assess color uniformity of the color in the melt, the color of yarn from each example is measured. The results are presented in Table 3.

TABLE 3

| Example | % Carbon Black in Yarn | ACS Color (CIE Lab) L Value* |
|---------|------------------------|------------------------------|
| A | 0.79 | 14.5 |
| B | 0.75 | 14.2 |
| C | 0.76 | 14.3 |
| D | 0.82 | 14.8 |

*Value represents average of 4 readings on each sample A–D.

What is claimed is:

1. In an apparatus for melting particulate polymeric material including a melting grid, a molten polymer reservoir beneath said grid and having a lateral cross-sectional contour defined by walls defining said reservoir, the improvement comprising:

a distribution device having substantially flat parallel upper and lower surfaces and adapted to the contour of said molten polymer reservoir and disposed in said molten polymer reservoir in proximity to said grid, said device comprising:

an internal reservoir formed between said upper and lower surfaces;

a perimetrical surface joining said upper and lower surfaces and providing said device with height;

at least two fluid distribution pores, each having one end in communication with said internal reservoir and another end disposed in said perimetrical surface; and an injection tube providing fluid flow communication between said internal reservoir and an external supply of fluid.

2. The apparatus of claim 1 wherein said distribution device is installed above molten polymer in said molten polymer reservoir.

3. The apparatus of claim 2 wherein said distribution device is installed about 1.25 to 1.5 inches above molten polymer in said molten polymer reservoir.

4. The apparatus of claim 2 wherein said distribution device has 4 to 8 of said distribution pores each spaced approximately evenly from a next adjacent pore.

5. The apparatus of claim 2 wherein said distribution device has a maximum width of 2.5 inches to 3 inches.

* * * * *

UNITED STATES PATENT AND TRADEMARK OFFICE
CERTIFICATE OF CORRECTION

PATENT NO.    : 5,741,532
DATED         : April 21, 1998
INVENTOR(S)   : Lilly et al.

It is certified that error appears in the above-indentified patent and that said Letters Patent is hereby corrected as shown below:

At column 1, line 37, please delete "staff" and insert --stuff-- in its place.

At column 3, line 62, please delete "dearly" and insert --clearly-- in its place.

At column 4, line 28, please delete "carder" and insert --carrier-- in its place.

At column 4, line 31, please delete "carder" and insert --carrier-- in its place.

At column 4, line 59, please insert a period (".") after "thereof" and before "It".

Signed and Sealed this

Twenty-eighth Day of July, 1998

*Attest:*

BRUCE LEHMAN

*Attesting Officer*     *Commissioner of Patents and Trademarks*